Nov. 24, 1931. A. J. WEATHERHEAD, JR 1,832,954
TUBULAR CONNECTION AND METHOD OF PRODUCING THE SAME
Filed Dec. 7, 1927
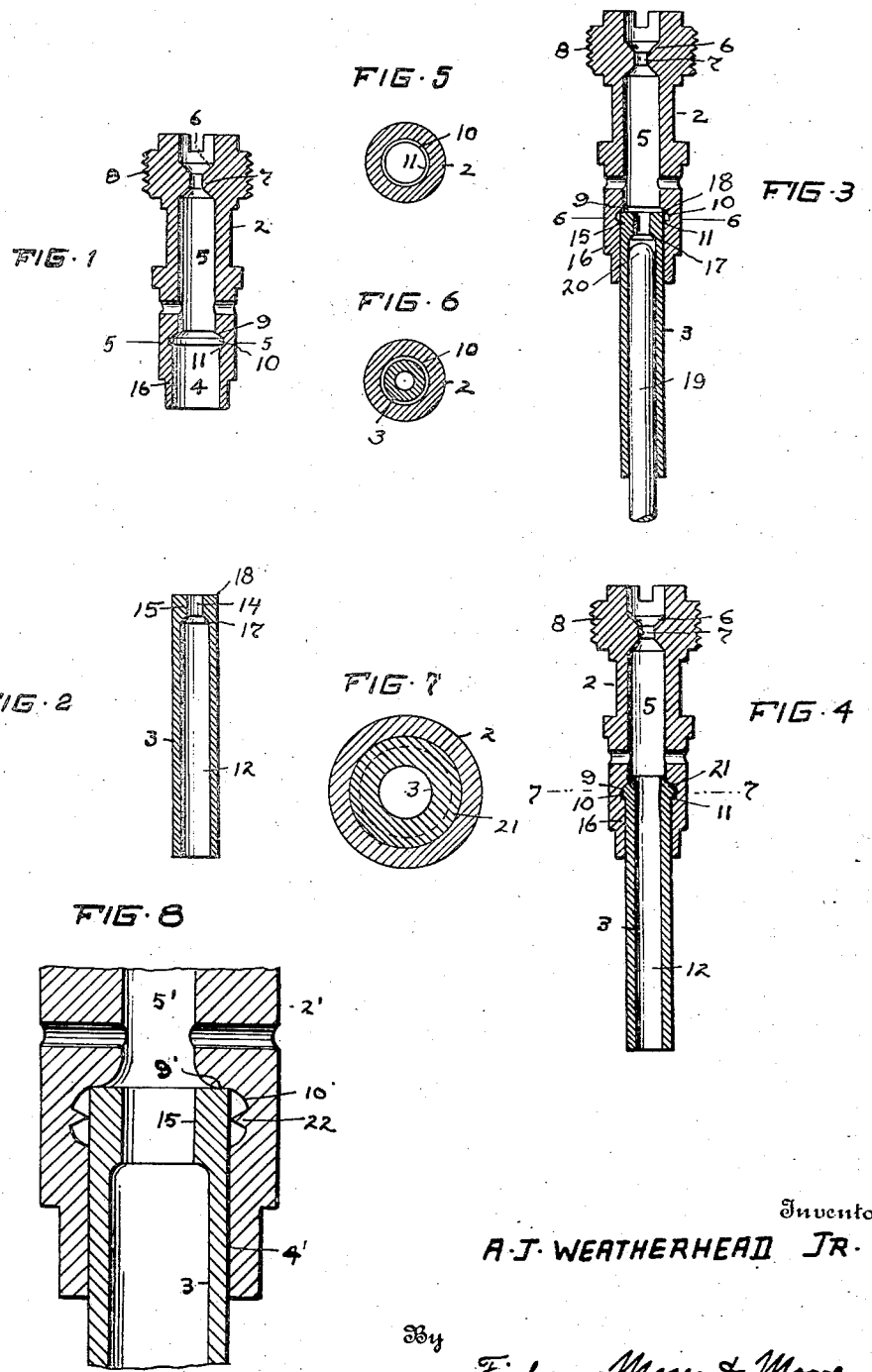
Inventor
A. J. WEATHERHEAD JR.
By Fisher, Moser & Moore
Attorneys Patented Nov. 24, 1931

1,832,954

UNITED STATES PATENT OFFICE

ALBERT J. WEATHERHEAD, JR., OF CLEVELAND, OHIO

TUBULAR CONNECTION AND METHOD OF PRODUCING THE SAME

Application filed December 7, 1927. Serial No. 238,418.

The present application relates to an improvement in tubular connections and a method of producing the same, and in general the object of the invention is to produce a permanent fluid-tight seal and rigid union between a tube and a chambered body member in a facile and inexpensive way.

In the accompanying drawings, Fig. 1 is a sectional view of a nozzle or body as constructed preliminary to uniting a tubular stem thereto, and Fig. 2 is a sectional view of the tubular stem as it is formed before the parts are assembled. Fig. 3 is a sectional view of the nozzle and stem loosely sleeved together, and Fig. 4 is a similar view of the parts united together. Fig. 5 is a cross sectional view of the nozzle member on line 5—5 of Fig. 1. Fig. 6 is a cross section on line 6—6 of Fig. 3. Fig. 7 is a cross section, enlarged, on line 7—7 of Fig. 4. Fig. 8 is a sectional view, enlarged, of a modification of the invention.

In producing various kinds of products made of brass or corresponding metals by automatic screw machine operations the size, shape and costs are factors to be considered. Thus to increase production and reduce costs I have found it desirable to make a device in two or more parts instead of in one piece, and to unite them together without soldering operations and with a better joint than if soldered together. Thus in making a device in two parts having co-extensive passages, for example, a chambered body part and a hollow stem, the main problem is to produce a fluid-tight seal and a permanently rigid interlocking union in a facile and inexpensive way. This has been accomplished by me as follows, using as one exemplification a chambered body or nozzle member 2 having a hollow stem or tube 3. Thus, in lieu of making body 2 and stem 3 in one piece, I feed a round rod of the desired stock into an automatic screw machine and cut short lengths therefrom to form body 2, and duplicate that operation with another rod to form hollow stem 3. The shape and outline of body 2 may vary, and suffice to say that the exterior is turned and finished to the desired shape automatically, and drilling of the body axially and laterally also takes place automatically. In the present body 2 the axial opening is drilled to provide two bores or chambers 4 and 5 of different diameters and a valve seat 6 having a still smaller orifice 7 within the screw-threaded head or enlargement 8 at the upper end of the body. Then an annular shoulder 9 is produced at the juncture of bores 4 and 5 together with an annular groove or channel 10. Shoulder 9 may be formed variously, but a beveled or sloping shoulder yields certain advantages in uniting the parts together. A square shoulder or sharp annular corner edge 11 is formed at the base of channel 10 opposite annular shoulder 9, the advantage of which or its equivalent will be explained hereinafter.

In producing hollow stem 3 a rod is cut to the desired length and drilled automatically to provide relatively long and short bores 14 and 12 of different diameter, thereby providing at one end a short annular wall 15 of greater thickness than the main wall 16 surrounding long bore 12, and thereby also producing an annular shoulder 17 at the juncture of the two bores 12 and 14. Now having completed two such drilled parts as described, the next step taken is to sleeve or telescope them together until the peripheral corner edge 18 of stem 3 impinges the annular shoulder 9 which forms a part of the wall of the annular groove or channel 10 in member 2 as shown in Fig. 3. The sharp corner edge 11 at the base of said channel is thereby disposed opposite the thick end or wall 15 of the hollow stem. A suitable tool 19 having a blunt, round or tapered end 20 is then introduced into the longer bore 12 of stem 3 and forced upwardly against the shouldered entrance 17 of smaller bore 14, the parts or sections 2 and 3 being held suitably in fixedly sleeved relation during such operations. The tool is of larger diameter than bore 14 and therefore when it is forced through the bore the stock in wall 15 is crowded outwardly and flows to some extent longitudinally until channel 10 in the chambered body 2 is filled, the general effect being to form a relatively thick flaring flange 21 at the inner or upper end of hollow stem 3. Furthermore, in crowding the stock outwardly in that way the wall 15 is forced into biting contact with the sharp corner edge 11 at the base of channel 10, thereby effectually sealing the joint between body 2 and stem 3 at a substantial distance inwardly of bore 4 in body 2. The seal tight union of the two parts is also preferably made remote from the lower end of body 2 to provide hollow stem 3 with a supporting wall 16 of substantial length. When the parts have been joined together in the way described the composite structure is in effect the same as if constructed in one piece but the cost of machine production is considerably reduced. In Fig. 8 I show a body 2' containing two bores 4' and 5' and an annular channel 10' which is divided by a sharp V-shaped annular rib 22. The thicker end 15 of tube 3 is in this case projected against a shoulder 9' at the juncture of the two bores 4' and 5', and then when the tool 19 is introduced into tube 3 and forced upwardly past the thicker wall 15 the metal in said wall is crowded outwardly against the sharp rib 22 and into the channel, thereby effectively locking and sealing the tube and body at the joint. Thus it will be seen that the shape of the channel and the stop shoulder in body 2' may be made variously and still produce an effective seal and joint by the steps taken and as herein described and claimed.

What I claim, is:

1. A method of producing tubular connections, consisting in forming an annular channel within the wall of a bore in one member; introducing a tubular member having internally increased wall thickness at one end with said end into said bore; and expanding the annular portion of said tubular member having the increased wall thickness into said channel.

2. A method of producing tubular connections, consisting in forming an annular channel with a sharp corner edge within the wall of a bore in one member having at one end internally increased wall thickness with said end; inserting a tubular member into said bore; and expanding the annular portion of said tubular member where increased in wall thickness into said channel tightly against said sharp corner edge.

3. A method of producing tubular connections, consisting in forming an annular channel having a sloping wall and a sharp angled shoulder within the wall of a bore in one member; inserting a tubular member having at one end internally increased wall thickness with said end into said bore until its end edge engages said shoulder; and then crowding the thicker portion of the wall of said tubular member in the region of said channel outwardly into the channel and against said angled shoulder.

4. A method of producing tubular connections, consisting in producing an annular channel within the wall of a round bore in one member; in forming an annular wall of greater thickness at one end of a tubular member than the main body thereof without increasing the outside diameter of such member; in placing said end of said tubular member into said bore opposite said channel; and then crowding the wall of greater thickness at the end of said tubular member outwardly into said channel and in tight locking engagement with the channel walls.

5. A method of producing tubular connections, consisting in drilling a bore within one member and forming an annular channel in the wall inwardly from one end of said bore; in drilling a second member with co-axial bores of different diameter and forming an annular shoulder at the juncture thereof; inserting said second member into the bore of said first member until the shouldered end thereof is contiguous to the annular channel within said first member; and then introducing a tool into said second member to expand and force the shouldered end of said second member into tight locking engagement with the walls of said channel.

6. A method of producing tubular connections, consisting in drilling co-axial bores of different diameters in a body member; producing a channel and a beveled shoulder in the wall of said member at the juncture of said bores; drilling co-axial bores of different diameters in a second member; sleeving said members together until the thicker end of the second member engages the beveled shoulder within said first member; and then inserting a tool to expand and force the stock in said thicker end into said channel and in locking engagement with the walls thereof.

In testimony whereof I affix my signature.

ALBERT J. WEATHERHEAD, Jr.